United States Patent [19]
Hurst, Jr. et al.

[11] Patent Number: 5,530,688
[45] Date of Patent: Jun. 25, 1996

[54] OPTICAL DISK RECORDING DEVICE USING TWO MODULATED LASER BEAMS FOR RECORDING INFORMATION DATA

[75] Inventors: Jerry E. Hurst, Jr., San Jose; Kurt A. Rubin, Santa Clara; Yenyu Hsieh, Milpitas, all of Calif.

[73] Assignee: International Business Machines Corporation, Armonk, N.Y.

[21] Appl. No.: 332,234

[22] Filed: Oct. 31, 1994

[51] Int. Cl.⁶ .................................................. G11B 7/00
[52] U.S. Cl. .................................. 369/116; 369/13
[58] Field of Search ............................ 369/116, 13, 112, 369/44.37, 44.38, 59, 62; 300/114, 59; 250/552, 553, 208.2, 208.4, 208.3, 208.5

[56] References Cited

U.S. PATENT DOCUMENTS

| | | | |
|---|---|---|---|
| 4,383,262 | 5/1983 | Noguchi | 369/116 |
| 4,473,829 | 9/1984 | Schouhamer Immink et al. | 347/264 |
| 4,488,277 | 12/1984 | McFarlane et al. | 369/48 |
| 4,610,009 | 9/1986 | Connell | 369/110 |
| 4,646,103 | 2/1987 | Sugiyama et al. | 369/116 |
| 4,731,773 | 3/1988 | Lewkowicz | 369/59 |
| 4,734,900 | 3/1988 | Davie | 369/59 |
| 4,774,522 | 9/1988 | Van Tongeren et al. | 347/225 |
| 4,866,692 | 9/1989 | Saito et al. | 369/116 |
| 4,872,078 | 10/1989 | Gerber et al. | 360/114 |
| 4,873,680 | 10/1989 | Chung et al. | 369/116 |
| 4,881,076 | 11/1989 | Ashley et al. | 341/95 |
| 4,928,187 | 5/1990 | Rees | 360/40 |
| 4,944,037 | 7/1990 | Ando | 369/13 |
| 4,949,196 | 8/1990 | Davie et al. | 360/40 |
| 4,998,237 | 3/1991 | Osakabe et al. | 369/109 |
| 5,001,692 | 3/1991 | Farla et al. | 369/116 |
| 5,003,527 | 3/1991 | Matsumoto et al. | 369/100 |
| 5,043,971 | 8/1991 | Van et al. | 369/124 |
| 5,060,222 | 10/1991 | Sawano et al. | 369/10 |
| 5,177,727 | 1/1993 | Mashino | 369/275.3 |
| 5,191,204 | 3/1993 | Dickson et al. | 250/208.2 |
| 5,231,545 | 7/1993 | Gold | 360/49 |
| 5,247,167 | 9/1993 | Bargerhuff et al. | 250/208.1 |
| 5,309,416 | 5/1994 | Iwanaga et al. | 369/13 |
| 5,353,265 | 10/1994 | Maeda et al. | 369/13 |
| 5,357,493 | 10/1994 | Okazaki et al. | 369/13 |
| 5,365,535 | 11/1994 | Yamaguchi et al. | 369/121 |
| 5,442,597 | 8/1995 | Spruit et al. | 369/13 |

FOREIGN PATENT DOCUMENTS

| | | |
|---|---|---|
| 0206824 | 12/1986 | European Pat. Off. |
| 55-139693 | 10/1980 | Japan . |
| 60-247827 | 12/1985 | Japan . |
| 63-263632 | 10/1988 | Japan . |
| 1-155522 | 6/1989 | Japan . |
| 1-229426 | 9/1989 | Japan . |
| 2-187934 | 7/1990 | Japan . |
| 2-208834 | 8/1990 | Japan . |
| 3-001346 | 1/1991 | Japan . |
| 3-035425 | 2/1991 | Japan . |
| 3-162742 | 7/1991 | Japan . |

Primary Examiner—Tan Dinh
Attorney, Agent, or Firm—Thomas R. Berthold

[57] ABSTRACT

An optical disk data storage system uses two lasers to write data on the disk, preferably using pulse width modulation (PWM). The lasers direct two independently controllable laser beams to the disk to form two spots that are spaced apart a fixed distance along the data track. Each laser is independently controlled by a modulator that causes the laser to emit the laser beam in a highly pulsed manner. The two laser beams can be simultaneously and independently pulsed along a single track and each beam may be pulsed on any given write clock period and at any of several different power levels. The pulsed lasers write spots of substantially the same size on the disk. The PWM run lengths are recorded on the disk as marks comprising either a single isolated spot or a series of contiguous or overlapping spots. The pulsing of the two lasers is synchronously interleaved so that either adjacent marks (mark-interleaved writing) or adjacent mark edges (edge-interleaved writing) are alternately written by the two lasers. In this manner, an amount of time elapses between the writing of successive marks or mark edges, thereby significantly reducing the effect of thermal buildup by allowing time for the data layer in the optical disk to cool.

23 Claims, 10 Drawing Sheets

OPTICAL DISK RECORDING DEVICE USING TWO MODULATED LASER BEAMS FOR RECORDING INFORMATION DATA

BACKGROUND OF THE INVENTION

1. Field of the Invention

This invention relates generally to optical disk drives and more particularly to such drives that write data by laser heating of the data layer on the disk.

2. Description of the Prior Art

Optical disk drives provide for the storage of great quantities of data on a disk. The data is accessed by focusing a laser beam onto the data layer of the disk and then detecting the reflected light beam. Magneto-optical (M-O) systems write data by directing a laser to a spot on the data layer to heat it above its Curie temperature while the magnetic domain of the spot is oriented in either an up or a down direction by an external magnetic field. The data is read by directing a low power laser to the data layer. The differences in magnetic domain direction of the spots cause the plane of polarization of the reflected light beam to be rotated either clockwise or counterclockwise. This change in orientation of polarization of the reflected light is then detected. Phase change systems write data by directing the laser to a spot on the data layer to cause a structural change of the data layer, typically from a crystalline phase to an amorphous phase. The data is detected as changes in reflectivity as the laser beam passes over the different phases. Alloying systems write data by the heating of two chemically distinct materials, such as $Bi_2Te_3$ and $Sb_2Se_3$, to form an amorphous alloy in the data layer. In alloying systems the data is detected as changes in reflectivity. In all of these types of systems the writing of data thus occurs due to laser heating of the material in the data layer.

Pulse position modulation (PPM) and pulse width modulation (PWM) are two general ways to write data as marks on optical disks. In PWM, a mark can be either an individual spot or a series of overlapping or contiguous spots. PPM records information as the distance between the centers of the marks on the disk. PWM records information as the distance between the transitions or edges of the marks. A transition is either the beginning (leading) or end (trailing) edge of a mark. PWM recording is preferred to PPM recording because PWM recording is able to store more information in the same amount of space on the disk. However, PWM recording is more difficult to implement because the mark edges must be precisely positioned and written with sharp boundaries to ensure accurate recording.

One problem with both PPM and PWM recording in optical disk drives that write data by laser heating, especially at high data densities, is the thermal buildup that occurs within the disk during the laser writing process which can cause great distortions in the precise placement of the laser spots and mark edges. Thermal buildup occurs when there is insufficient time between the writing of successive spots to allow the data layer to cool. Under these conditions thermal preheating or cooling of the material in the data layer caused by the prior write history can lead to errors in the size and placement of the spots. This problem becomes more significant as the linear density of the spots increases and the spacing between the spots decreases because the peak temperature of this thermal interaction increases.

One proposed solution to thermal buildup is to adjust the laser pulse duration to achieve the correct mark length. Some systems use a series of highly pulsed laser beams to write contiguous or overlapping circular spots to form one long mark on the disk. However, these systems still experience some thermal buildup with the resulting inaccuracy in the placement of the mark edges and thus a blurring of the data transitions. Another proposed solution is to increase the local velocity of the disk beneath the laser spot so there is insufficient time for the heat to flow to an adjacent spot before that spot is written. However, this approach requires more precise focus and tracking servo systems and disks that have little axial and radial runout.

What is needed is a relatively simple optical disk drive that writes marks on the disk so that the mark edges are precisely aligned without the adverse effect of thermal buildup.

SUMMARY OF THE INVENTION

The present invention is an optical disk drive that uses two lasers to write data on the disk, preferably using PWM. The lasers direct two independently controllable laser beams to the disk to form two spots that are spaced apart a fixed distance along the data track. Each laser is independently controlled by a modulator that causes the laser to emit the laser beam in a highly pulsed manner. The two laser beams can be simultaneously and independently pulsed along a single track. Each beam may be pulsed on any given write clock period and at any of several different power levels. The pulsed lasers write spots of substantially the same size on the disk. The PWM run lengths are recorded on the disk as marks comprising either a single isolated spot or a series of contiguous or overlapping spots. The pulsing of the two lasers is synchronously interleaved so that either adjacent marks or adjacent mark edges are alternately written by the two lasers. In this manner, an amount of time elapses between the writing of successive marks or mark edges, thereby significantly reducing the effect of thermal buildup by allowing time for the data layer to cool. This amount of time is equal to the spacing distance between the two spots made by the two lasers divided by the local disk velocity beneath the spots.

Two interleaved writing techniques that may be used are referred to as mark-interleaved writing and edge-interleaved writing. The first spot in a run is referred to as a leading edge spot and the last spot in a run is referred to as a trailing edge spot. The shortest PWM run is usually formed by one spot whereas longer PWM runs require at least leading edge and trailing edge spots but may include additional filler spots in between. In mark-interleaved writing, each successive PWM run is alternately written by the two lasers, thereby minimizing inter-run thermal interference. In edge-interleaved writing each adjacent leading and trailing edge spot is alternately written by the two lasers, thereby minimizing intra-spot thermal interference. Also, in edge-interleaved writing all filler spots required for a given PWM run are written by the same laser that made the leading edge spot of that run.

These techniques can also be applied to PPM recording to reduce thermal interactions, in which case mark-interleaved and edge-interleaved writing are identical. Residual thermal and optical interactions can be reduced further by allowing for additional power levels in each laser beam.

To implement either of the interleave writing techniques it is necessary to precisely control the relative pulse timing of the two lasers. If the two optical spots are separated along the track by a spacing distance D, the pulsing of the second laser must be delayed by a time equal to D/V, where V is the local disk velocity. In practice this delay may be implemented by a variable delay element and set using either trial writing, direct feedback from the spindle motor via a velocity sensor, reading of an embossed timing mark (sync byte) by the two lasers, or reading by the second laser of a timing mark (sync byte) written by the first laser. Since most optical disk drives use constant angular velocity recording, this velocity V will be a function of the disk radius.

For a fuller understanding of the nature and advantages of the present invention, reference should be made to the following detailed description taken in conjunction with the accompanying drawings.

DESCRIPTION OF THE PREFERRED EMBODIMENTS

Overview of the Optical Disk Drive

Figure 1:
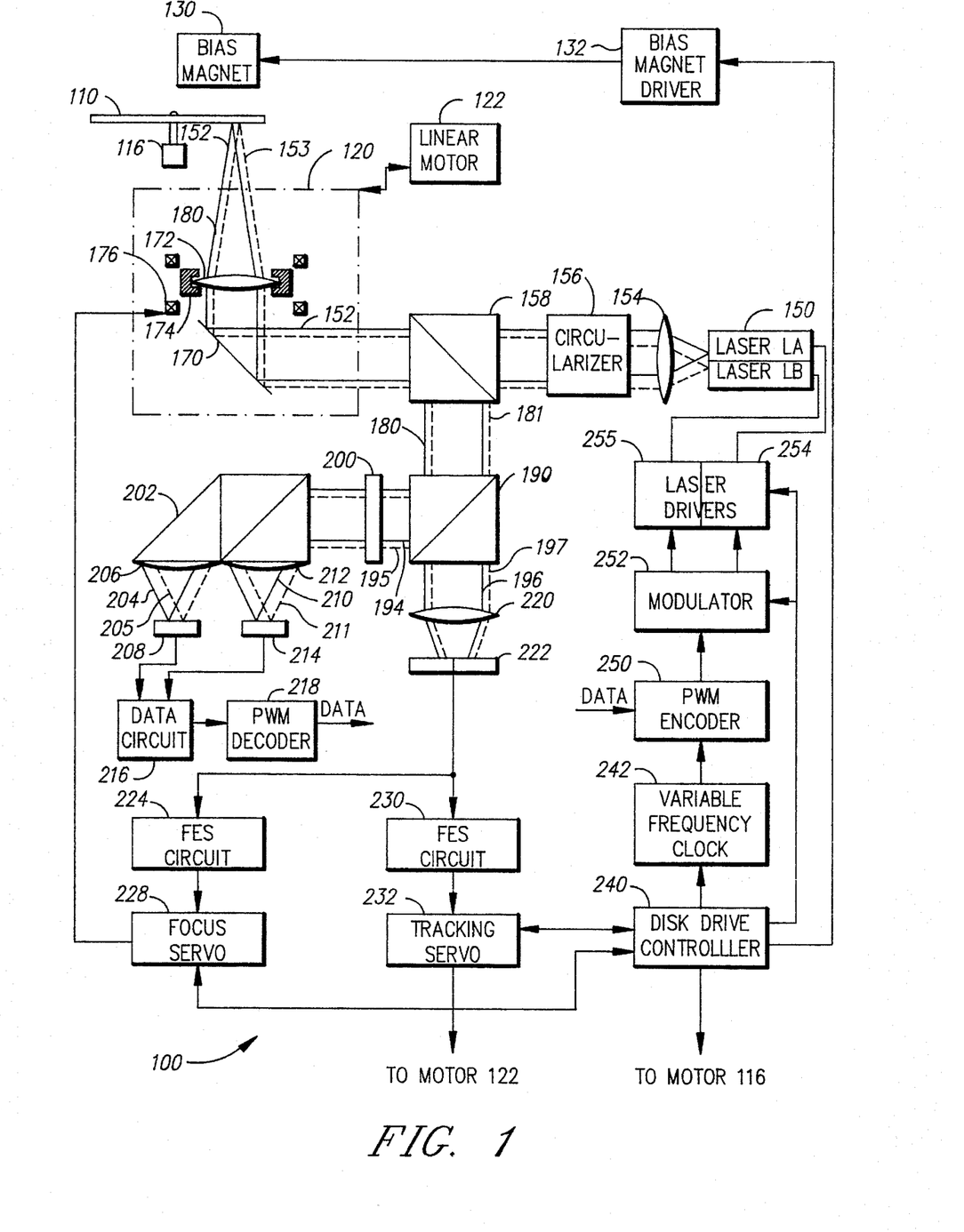
FIG. 1 is a block diagram of the optical disk drive according to the present invention.

A diagram of an optical disk drive according to the present invention is shown in FIG. 1. The disk drive 100 uses an optical disk 110 that may be a standard M-O disk. Disk 110 is mounted to a spindle motor 116. An optical head 120 that directs and focuses two optical laser light beams 152, 153 is positioned below disk 110. The two beams 152, 153 are focused to spots on disk 110 that are separated a distance D along the data tracks. Head 120 is movable in a radial direction relative to disk 110 by a linear motor 122 to move the laser beams 152, 153 to different data tracks. A bias magnet 130 is located above disk 110 and is connected to a bias magnet driver 132. Bias magnet 130 reorients the magnetic transitions on the M-O data layer on disk 110 when the M-O data layer is heated by the light beams 152 or 153.

Laser array 150 has two lasers LA and LB that produce the two light beams 152, 153, respectively. Laser array 150 is preferably a two element gallium-aluminum-arsenide laser diode array that produces two separate polarized laser light beams. However, any type of laser array or separate lasers may be used and the two beams do not need to be polarized relative to each other. When data is being read or erased from the optical disk only one of the two lasers in the array is used. Servo signals for tracking and focusing are at all times derived from this particular laser only.

Light beams 152, 153 exit the lasers LA and LB separated by a small distance, e.g. 50 microns. Because of this small spacing the beams 152, 153 can be considered as essentially overlapping or nearly collinear, so that only a single optical head 120 and related elements in the light path is needed. Thus the optical path will be explained only with respect to light beam 152 from laser LA in the array, it being understood that this explanation will apply equally as well for light beam 153 from laser LB.

Light beam 152 is collimated by a lens 154 and circularized by a circularizer 156. Circularizer 156 is preferably a prism. Beam 152 then passes through a beamsplitter 158 to a mirror 170. Mirror 170 reflects the light toward a focusing lens 172. Lens 172 focuses beam 152 onto disk 110. Lens 172 is mounted in a lens holder 174. Holder 174 is movable relative to disk 110 by an actuator motor 176. Mirror 170, lens 172, holder 174 and motor 176 are preferably located in the optical head 120, which is movable radially relative to the disk 110 by linear motor 122. Lens 172 also focuses beam 153 onto disk 110.

Beams 152 and 153 and focused to the same data track on disk 110 but are spaced apart a distance, D, along the data track. The spacing D, which is approximately 10 microns if the laser elements are spaced apart 50 microns in the laser array 150, is fixed. The fixed spacing occurs because the lasers constituting the laser array are fixed in the laser array 150. In a typical embodiment the lasers LA and LB have a fixed spacing in the laser array 150 of 50 microns. This spacing will be adequate to reduce much of the crosstalk between the laser elements, such as thermal and inductive capacitive crosstalk. The fixed spacing D between the imaged laser spots on the disk will be less than this 50 microns for two reasons. First, there is a demagnification factor equal to the ratio of the focal length of the objective lens to the focal length of the collimator lens. A typical objective lens focal length is 3 mm and a typical collimator lens focal length is 6 mm so this results in a demagnification factor of 2:1. Second, the semiconductor laser beams are intrinsically elliptical so there is an additional demagnification factor, typically 2.5:1, that results from circularizing the beams. The result is that the 50 micron spacing in the laser array is reduced by a factor of 5 (2×2.5) to approximately a spacing D of 10 microns on the disk.

As a result of light beam 152 striking disk 110, a light beam 180 is reflected from the disk 110. (A similar reflected light beam 181 corresponds to light beam 153). The reflected beam 180 passes back through lens 172 and is reflected by mirror 170. A portion of light beam 180 is then reflected by beamsplitter 158 to a beamsplitter 190. Beamsplitter 190 divides the beam 180 into a data beam 194 and a servo beam 196.

Data beam 194 passes through a half waveplate 200 to a polarizing beamsplitter 202. Beamsplitter 202 divides beam 194 into orthogonal polarization components. A first polarization component beam 204 is focused by a lens 206 to a data detector 208. A second polarization component 210 is focused by a lens 212 to a data optical detector 214.

Figure 2:
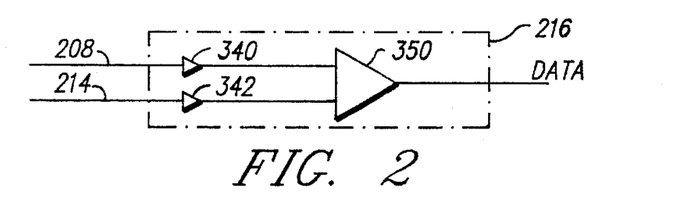
FIG. 2 is a circuit diagram of the data circuit.

A data circuit 216 is connected to detectors 208 and 214, and generates a PWM data signal representative of the pattern of transitions recorded on disk 110. Data circuit 216 is connected to a PWM decoder 218 that converts the PWM signal to a digital data signal that is sent to the host computer. As shown in FIG. 2, data circuit 216 has a plurality of amplifiers 340 and 342 connected to detectors 208 and 214, respectively. A differential amplifier 350 is connected to amplifiers 340 and 342, and generates a PWM data signal representative of the marks previously written on disk 110.

Servo beam 196 is focused by a lens 220 onto a segmented optical detector 222, such as a spot size measuring detector as is known in the art. A focus error circuit 224 is connected to detector 222. A focus servo 228, as is known in the art, is connected to focus error signal (FES) circuit 224 and motor 176. Servo 228 controls motor 176 to adjust the position of lens 172 as appropriate to maintain proper focus of light beam 152 on disk 110. A tracking error signal circuit 230 is also connected to detector 222. A tracking servo 232, for data track following and seeking is connected to tracking error signal (TES) circuit 230 and motor 122. Servo 232 causes motor 122 to adjust the radial position of head 120 as appropriate.

A disk drive controller 240, as is known in the art, is connected to and provides overall control for tracking servo 228 and focus servo 232, spindle motor 116, magnet driver 132, and a variable frequency clock 242. Controller 240 adjusts the clocking speed of the clock 242 as appropriate depending upon the position of head 120. The spindle motor 116 is controlled to spin at a constant angular velocity and the linear velocity of beam 152 relative to disk 110 will vary depending upon the radial position of head 120. Variable frequency clock 242 (sometimes referred to as a frequency synthesizer) is well known in the art.

Clock 242 is connected to a PWM encoder 250. Encoder 250 receives from the host computer a digital data signal corresponding to the data that is to be written onto disk 110 and encodes it into the desired PWM data pattern. In the preferred embodiment, encoder 250 is a (1,7) RLL PWM encoder. RLL encoders are well known in the art and implement a variety of RLL codes. An example of a (1,7) encoder is described in IBM's U.S. Pat. No. 4,488,142 and an example of a (2,7) encoder is described in IBM's U.S. Pat. No. 3,689,899.

Encoder 250 is connected to a modulator 252. As will be explained in detail later, modulator 252 receives the PWM data and causes the lasers LA and LB, via their associated laser drivers 254, 255, to write the desired mark-interleaved and edge-interleaved patterns onto disk 110.

Figure 3:
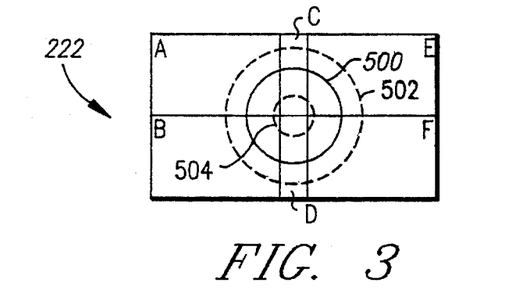
FIG. 3 is a top view of the optical detector shown in FIG. 1 for generating focus and tracking signals.

The detector 222 that is used to generate signals for tracking and focusing is shown in a top view in FIG. 3. Detector 222 is divided into six sections, 222A, 222B, 222C, 222D, 222E and 222F.

Figure 4:
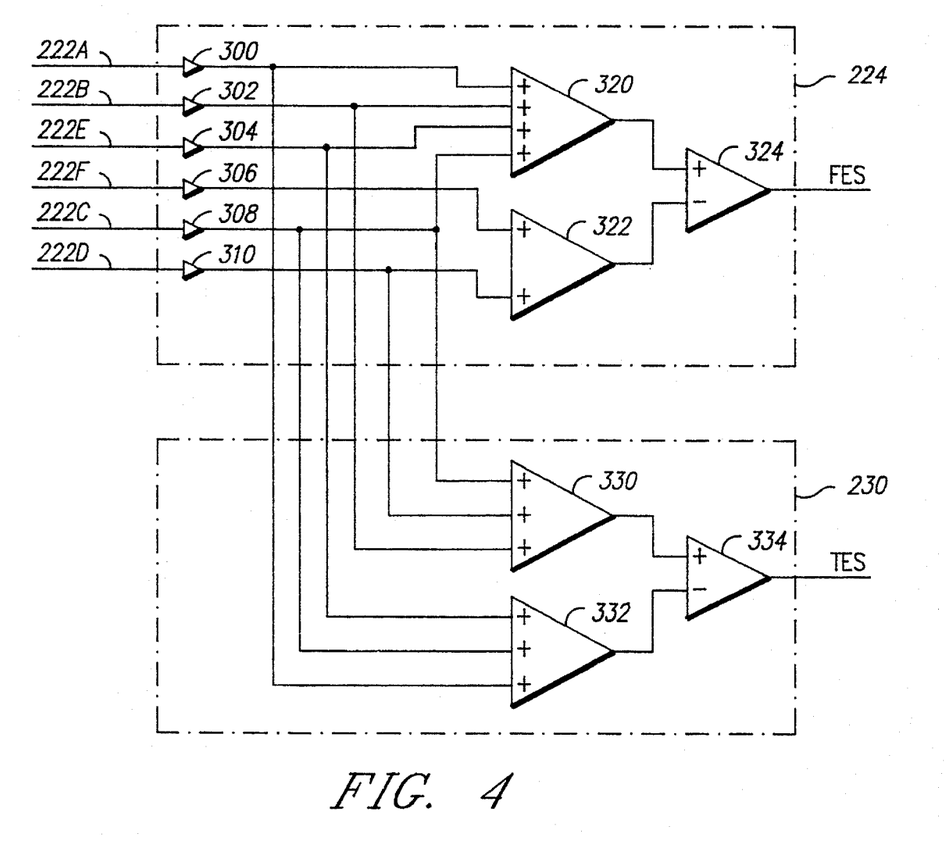
FIG. 4 is a circuit diagram of the focus and tracking circuit.

The circuit diagram of the TES circuit 230 and the FES circuit 224 that receive the output of the detector 222 sections is shown in FIG. 4. FES circuit 224 comprises a plurality of amplifiers 300, 302, 304, 306, 308 and 310 connected to detector sections 222A, 222B, 222E, 222F, 222C and 222D, respectively. A summing amplifier 320 is connected to amplifiers 300–306 and a summing amplifier 322 is connected to amplifiers 308 and 310. A differential amplifier 324 is connected to summing amplifiers 320 and 322 and generates the FES. TES circuit 230 comprises a pair of summing amplifiers 330 and 332, and a differential amplifier 334. Amplifier 330 is connected to amplifiers 302, 306 and 310, and amplifier 332 is connected to amplifiers 300, 304 and 308. Differential amplifier 334 is connected to amplifiers 330 and 332 and generates a TES.

Mark-Interleaved and Edge-Interleaved Writing

PWM recording uses the distance between transitions of recorded runs to encode digital data. The length between transitions contains the information of the digital data. There are many different encodings schemes known in the art that may be used to encode digital data into PWM marks. The most popular type of encoding schemes use run length limited (RLL) codes. These RLL codes use a small set of run lengths, which when used in different combinations, encode any pattern of digital data. A run length is defined as the distance between the leading edge and the trailing edge of a mark. RLL codes are defined in units of a time period T. In data recording disk drives this time period T corresponds to a linear distance the data track moves when the disk rotates in the time period T. The RLL codes are designated in the form (d−1, k−1), where d is the minimum run length (in time periods T) and k is the maximum run length (in time periods T). For example, a (1,7) RLL code has a minimum run length of 2T and a maximum run length of 8T.

Figure 5A:
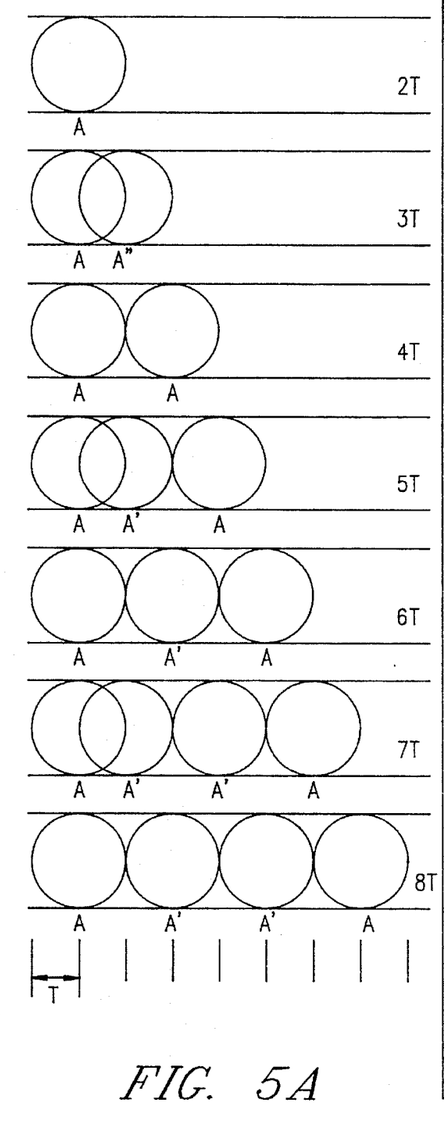
FIG. 5A is a diagram of the recording pattern using mark-interleaved writing that implements a (1,7) RLL code.

FIG. 5A is a diagram of the recording pattern of the present invention using mark-interleaved writing that implements a (1,7) RLL code. The code consists of a set of run lengths of 2T to 8T. Each laser has three distinct power levels, represented in FIG. 5A as A, A' and A" for laser LA. Each of the individual spots in the run length patterns is made by focusing the laser beam to its smallest spot size. These patterns are written along concentric or spiral tracks on the optical disk. The horizontal bracketing lines in FIG. 5A represent the data tracks. All of the run length marks are formed by either an isolated spot or connecting spots. The connecting spots can be either overlapping or contiguous. Overlapping spots are shown by the 3T run length made by laser LA at successive power levels of A and A". Contiguous spots are defined as those that touch but do not overlap. Contiguous spots are shown by the 4T run length made by laser LA at successive pulses at power level A.

FIG. 5A shows only the set of marks made by laser LA. In mark-interleaved writing alternate marks on the disk are made by alternating the two lasers LA and LB. Thus if the mark to be made immediately after a 4T run length (made by pulsing laser LA twice at power level A) was a 3T mark, this 3T mark would be made by pulsing laser LB first at power level B and then at power level B" so that two overlapping spots are formed.

The minimum run length of 2T is comprised of a single isolated spot formed at power level A. The 3T run length is comprised of a first spot formed at power level A and a second spot formed at power level A" that overlaps the first spot by one half a spot diameter. The 4T run length is comprised of two contiguous spots formed at power level A. The 5T run length is comprised of a first spot formed at power level A, a second spot formed at power level A' that overlaps the first spot by one half a spot diameter, and a third spot formed at a power level A that is contiguous with the second spot. The 6T run length is comprised of a first spot formed at power level A, a second spot formed at a power level A' that is contiguous with the first spot, and a third spot formed at a power level A that is contiguous with the second spot. The 7T run length is comprised of four spots, the first two of which are formed in the manner described above for the 5T run, the third formed at a power level A' and contiguous with the second spot, and the fourth formed at a power level A that is contiguous with the third spot. The maximum run length of 8T is comprised of four contiguous spots, the first and last of which are formed at a power level A and the second and third of which are formed at a power level A'.

This recording pattern reduces the thermal buildup in the disk between successive spots to a minimum and insures that the leading and trailing edges of each mark will be accurately positioned. The pattern uses the absolute minimum number of spots to write the desired run lengths. Where the spots must overlap by one half a spot diameter, the second spot is written at a reduced power level. Where there are three or more spots, and an overlap must occur, the overlap does not occur on the trailing edge spot. This helps insure that the trailing mark edge, which is most susceptible to the thermal heat buildup, will be accurately positioned. As a special case, the 3T run, which is comprised of two spots, uses power level A" to ensure that this mark length is accurately written.

Figure 5B:
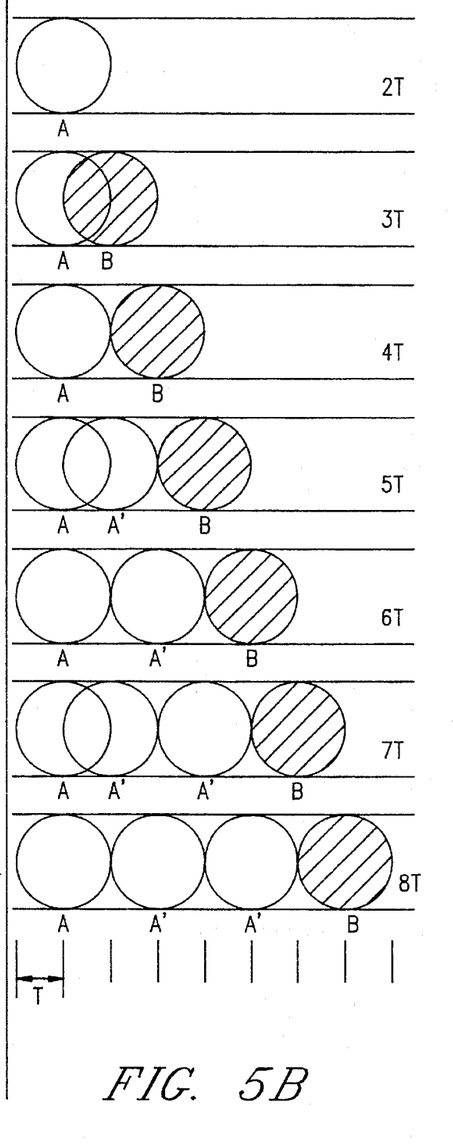
FIG. 5B is a diagram of the recording pattern using edge-interleaved writing that implements a (1,7) RLL code.

FIG. 5B is a diagram of the recording pattern of the present invention using edge-interleaved writing that implements a (1,7) RLL code. The run length patterns are identical to that described above for mark-interleaved writing. The difference is the manner in which the individual spots are written by the separate lasers LA and LB. In edge-interleaved writing according to the present invention, successive leading and trailing edges of adjacent marks are made by alternating between the two lasers. The laser that forms the leading edges of runs comprised of more that one spot also forms any additional intermediate filler spots before the other laser forms the trailing edge spot. In the special case of a 2T run length where the mark is a single spot formed by one of the two laser beams, the leading and trailing edges are necessarily made by the same laser, but the leading edge of the next mark is then made by the other laser.

In the preferred embodiment, a (1,7) RLL code is used and only the 2T–8T run lengths are needed. However, the present invention can be used with any number of (d,k) RLL codes and with other encoding techniques.

Figure 6:
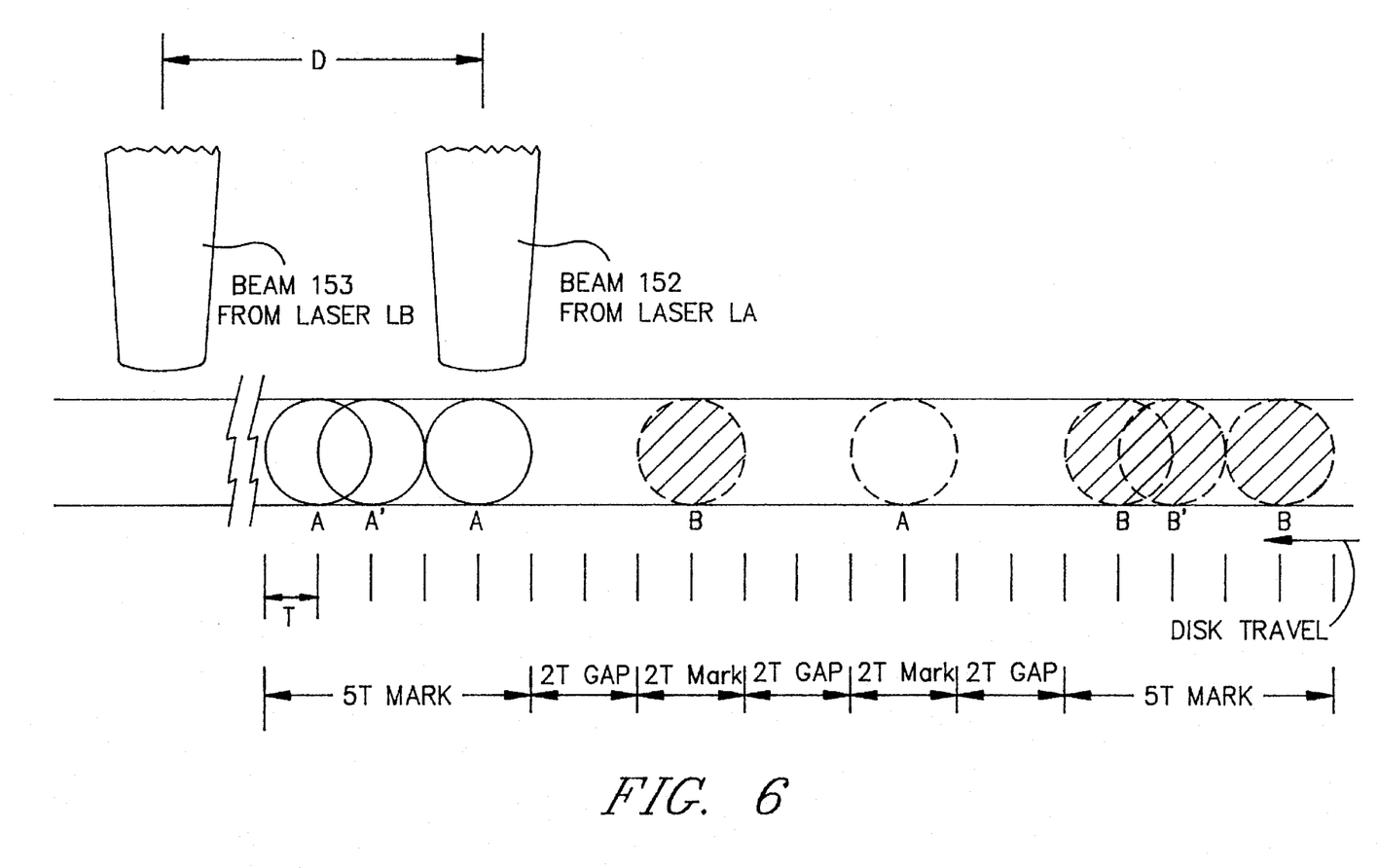
FIG. 6 is an illustration of the application of mark-interleaved writing to a specific data sequence using (1,7) RLL run lengths.

FIG. 6 illustrates the application of mark-interleaved writing to a specific data sequence to be recorded on the optical disk. The pattern is a 5T mark, 2T gap, 2T mark, 2T gap, 2T mark, 2T gap, 5T mark sequence hereafter denoted as [5m,2g,2m,2g,2m,2g,5m] sequence. (In FIG. 6, as well as in FIG. 7 to be described later, the dashed circles represent spots not yet written and the solid circles represent spots that have been written after the disk has moved under the lasers). Note that successive marks are alternately formed by the two lasers, each of which can have two distinct power levels denoted by A=B and A'=B'. In practice power level A=B is greater than power level A'=B'. Where marks overlap by one half a spot diameter, power level A'=B' is used to form the second mark. The manner in which the two spaced-apart lasers LA and LB form the spots in the data pattern to significantly reduce thermal buildup can be understood by a representative example. The direction of disk travel under the lasers is shown by the arrow. If the disk local velocity V is 9.4 m/sec. and T is 35.4 ns for a 1,7 RLL code, then the disk will move approximately 0.333 microns in time T. Thus the first 5T mark will be written by laser LA, the disk will move 2.664 (8×0.333) microns in the next 8T cycles, and the second 2T mark (represented by the dashed "A" circle to the right of the dashed "B" circle in FIG. 6) will then be written by laser LA. Laser LA continues writing. After the first mark written (the 5T mark) passes laser LB, which is 10 microns down the track from laser LA, laser LB will write the first 2T mark that is spaced a 2T gap from the first 5T mark. During the period of time it has taken for the marks to move from laser LA to laser LB (i.e., 1063 ns=D/V) there has been time for the data layer to cool. The total time between the pulsing of laser LA to write the last spot of the first 5T mark and the pulsing of laser LB to write the spot forming the adjacent 2T mark is 1204.6 ns (1063 ns+4T time of 141.6 ns=1204.6 ns), the 4T being the spacing between the trailing edge of the 5T mark and the trailing edge of the 2T mark. Once the beginning of the data pattern reaches laser LB, the lasers then write alternate marks.

Figure 7:
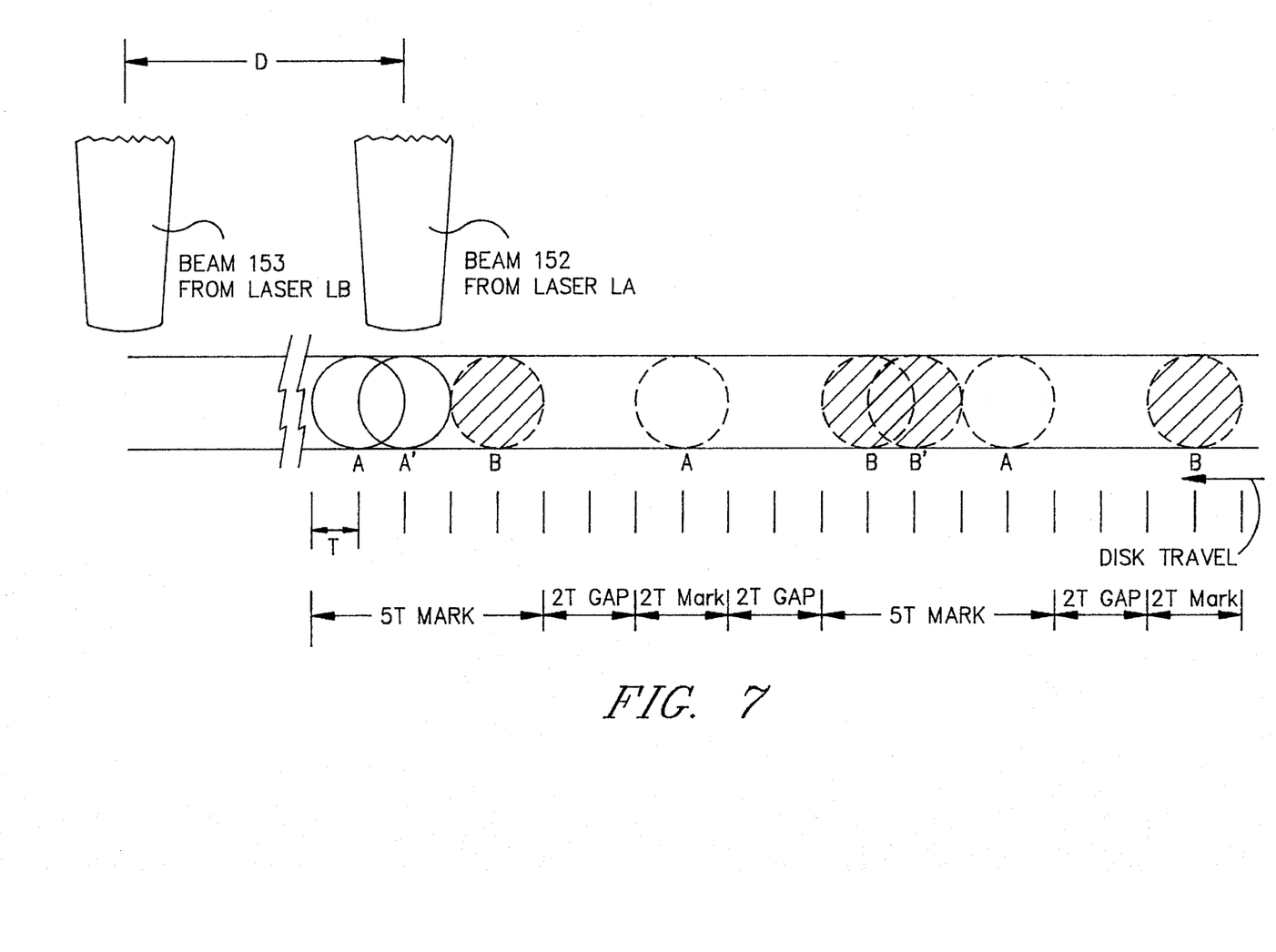
FIG. 7 is an illustration of the application of edge-interleaved writing to a specific data sequence using (1,7) RLL run lengths.

FIG. 7 illustrates the application of edge-interleaved writing to a specific data sequence to be recorded on the optical disk. The pattern is a repeating [5m,2g,2m,2g] sequence. Note that the spots forming the successive leading and trailing edges are alternately written by the two lasers. This leads naturally to a periodic role reversal of the two lasers each time a 2T mark is written in the data sequence because both the leading and trailing edge of a 2T mark (a single spot) are made by the same laser. This can be seen in FIG. 7 that shows each successive 2T mark made by a different laser. The operation of lasers LA and LB is essentially the same as described for FIG. 6, i.e., the spots written by laser LB are written at least 1063 ns later so that there is sufficient time for the data layer to cool. For example, as shown in FIG. 7, the contiguous trailing spot in the 5T mark will be written by laser LB 1133.4 ns (1063 ns+2T time of 70.4 ns=1133.4 ns) after the contiguous middle spot in the 5T mark is written by laser LA at power level A'.

Modulation for Mark-Interleaved and Edge-Interleaved Writing

Figure 8A:
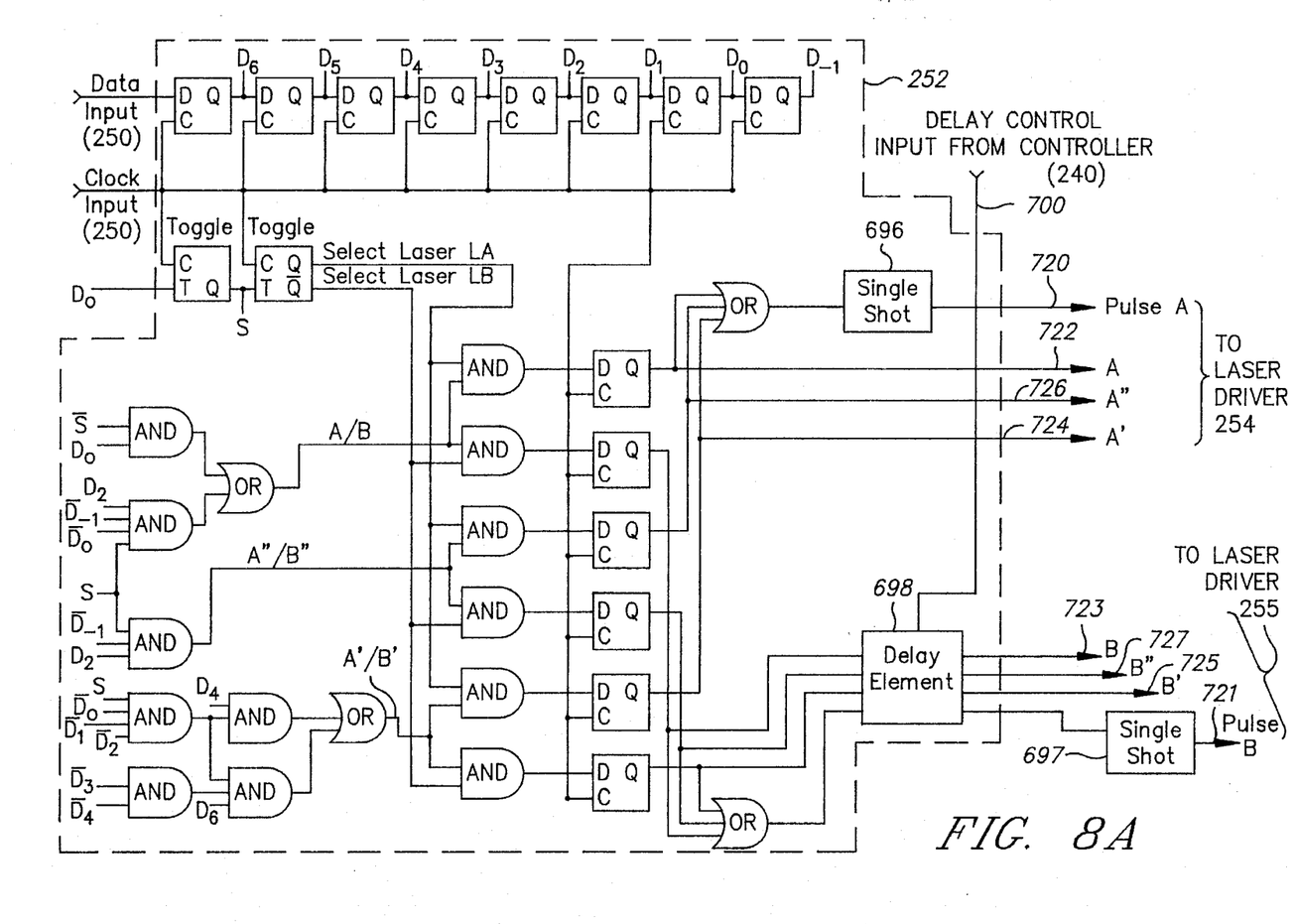
FIG. 8A is a circuit diagram of a preferred embodiment of the modulator that implements mark-interleaved writing.
Figure 8B:
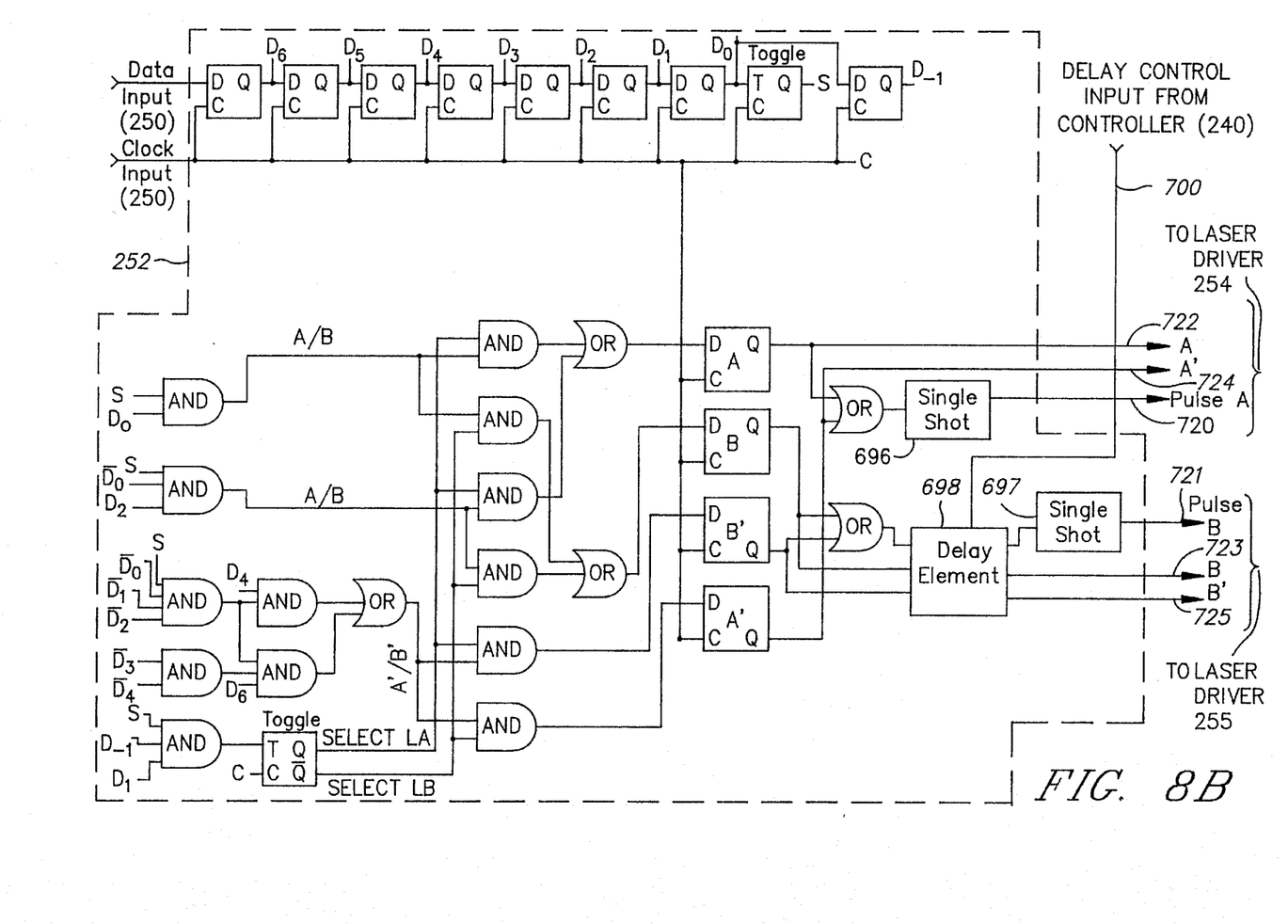
FIG. 8B is a circuit diagram of a preferred embodiment of the modulator that implements edge-interleaved writing.

Modulator 252 (FIG. 1) provides modulation signals for the two lasers LA and LB at any of three distinct power levels defined by their associated laser drivers 254, 255. FIG. 8A is a circuit diagram of a preferred embodiment of the modulator 252 that implements mark-interleaved writing and FIG. 8B is a circuit diagram of a preferred embodiment that implements edge-interleaved writing.

In both embodiments, modulator 252 includes a plurality of gates, flip-flops, single-shots 696, 697, and a variable or settable delay element 698. Modulator 252 takes the data signal from PWM encoder 250 and converts it into instructions to the laser drivers 254, 255 for writing the patterns of marks on the disk. For mark-interleaved writing (FIG. 8A) output lines 720, 722, 724, 726 lead to laser driver 254 for laser LA and output lines 721, 723, 725, 727 lead to laser driver 255 for laser LB. Lines 722, 724, 726 and 723, 725, 727 provide signals for power levels A, A', A" and B, B', B" for lasers LA and LB, respectively. For each laser, only one of these lines will be raised at a time to inform the associated laser driver which power level to use. The single shots 696, 697 control the duration of the laser pulses on output lines 720, 721 for lasers LA and LB, respectively. This pulse duration should be as small as possible and is approximately 15 ns or less in the preferred embodiment using M-O media.

Figure 9:
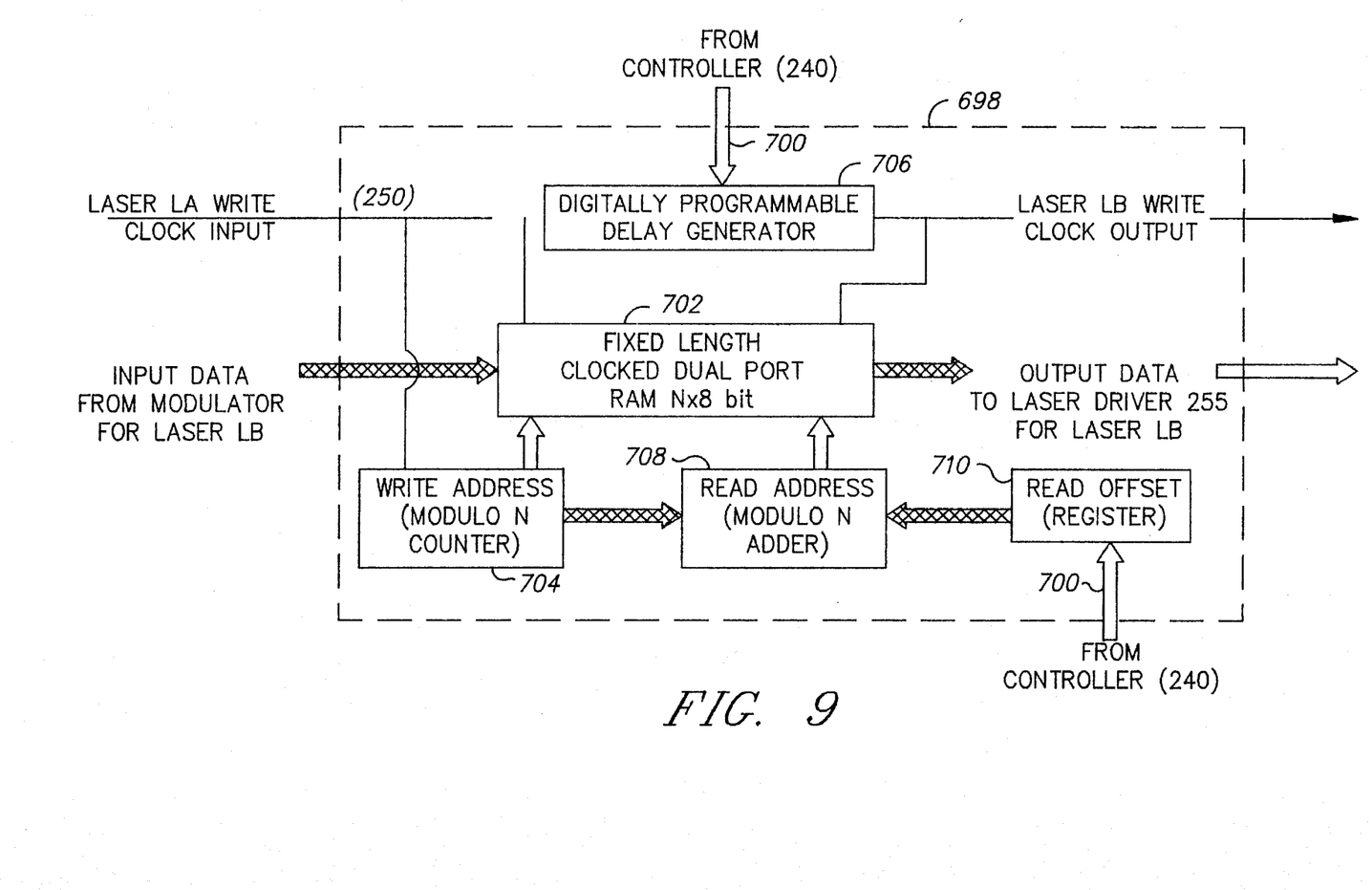
FIG. 9 is a block diagram of the settable delay element for controlling the timing of the pulsing of the two lasers.

The settable delay element 698 is controlled by controller 240 and delays the pulsing of laser LB. When the optical drive performs its standard calibration procedure, the settable delay element is recalibrated to delay the pulsing of laser LB by the newly calibrated delay time. A detailed diagram of the settable delay element 698 is shown in FIG. 9. The modulation data for laser LB is temporarily stored in a dual port RAM 702. These RAM modules are commercially available components, such as Integrated Device Technology IDT7140SA. The clocking operation for this RAM store is provided by the write clock for laser LA and the address for this store is generated by a modulo-N counter 704 clocked by the write clock for laser LA, where N is the length of the dual port RAM 702. N should be about 1K for typical applications. The RAM 702 serves as a ring buffer.

The second port of the dual port RAM 702 is used to read data out of the delay element 698. The clocking for this read operation is provided by a phase shifted version of the laser LA write clock, the phase delay being 0<Td<T and, generated by a digitally programmable delay generator 706. These delay generators consist of a DAC, ramp generator, and comparator combined into a single integrated circuit chip and are commercially available, such as the Analog Devices AD9501. The address for this read operation is generated in modulo-N adder 708 by adding a programmable read offset to the write address so that the read operation is delayed by a fixed number of write clocks plus the phase delay, Td. The phase delay from delay generator 706 and the offset from read register 710 are programmed by the optical disk drive controller 240. The phase delay is a fraction of a clock period T and the read offset is an integer number of clock cycles. In the example given, where the delay is 1063 ns, the total delay time is 100.8565 clock cycles (each clock cycle being 35.4 ns). Thus the value from delay generator 706 is 0.8565 and the value of the read offset from register 710 is 100. The sum of these two delays is adjusted by trial writing and reading by the controller 240 during the calibration procedure until optimum writing is achieved. Since these clocks typically scale with radius in a banded media application, only small adjustments of the delay element 698 will be required.

The circuit for edge-interleaved writing (FIG. 8B) is similar, the primary difference being that one less output line is required to each laser driver because only two, rather than three, power levels are provided to the laser drivers.

Figure 10A:
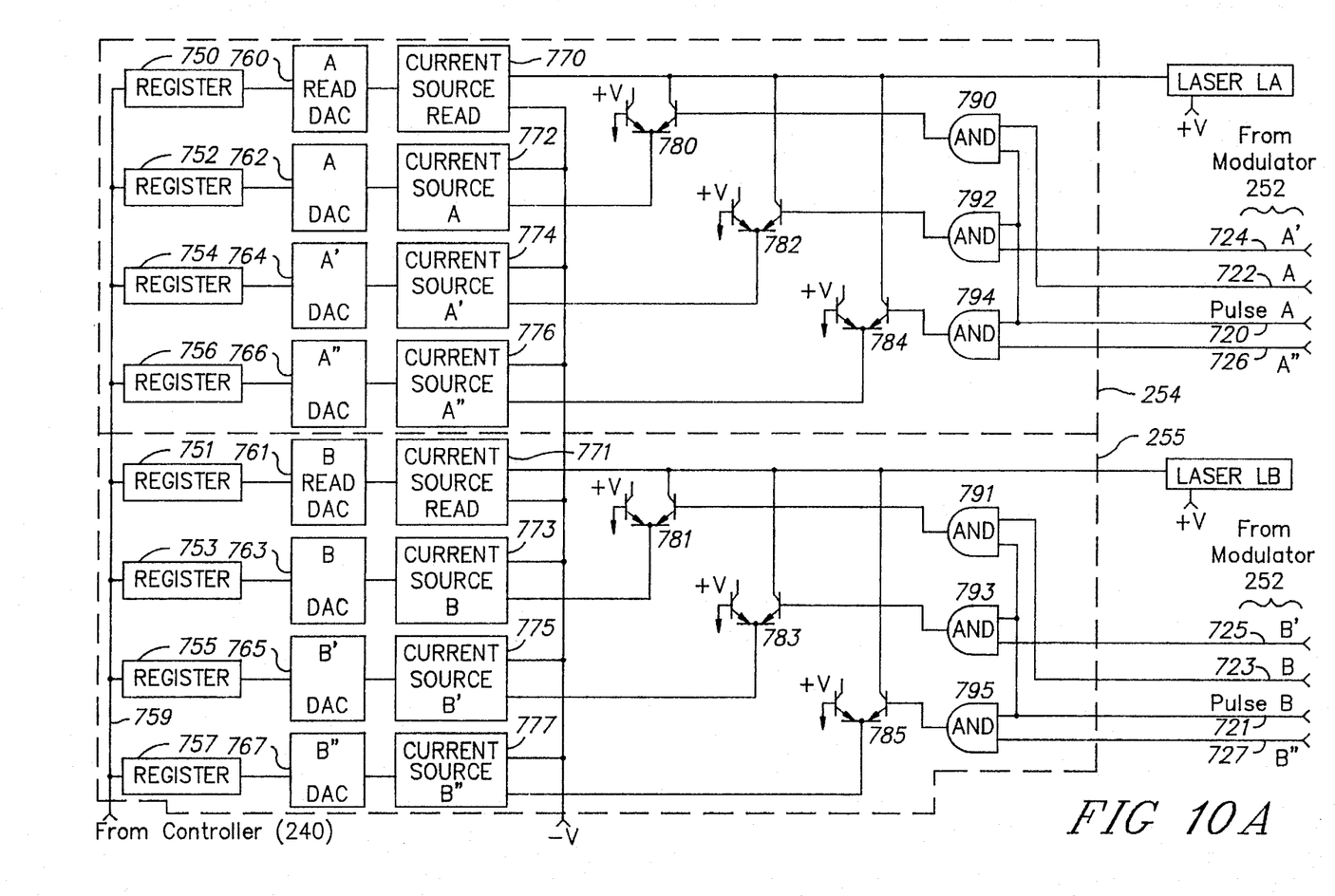
FIG. 10A is a circuit diagram of the modulator for the laser drivers that implements mark-interleaved writing.

FIG. 10A is a circuit diagram illustrating the preferred embodiment of laser drivers 254, 255 that implement mark-interleaved writing according to the present invention. Registers 750, 752, 754, 756, digital-to-analog converters (DACs) 760, 762, 764, 766, current sources 770, 772, 774, 776, and transistor pairs 780, 782, 784 are all associated with laser LA. Registers 755, 753, 755, 757, DACs 761, 763, 765, 767, current sources 771, 773, 775, 777, and transistor pairs 781, 783, 785 are all associated with laser LB. Controller 240 is connected to the registers 750–757 via a bus 759. Controller 240 sets the current level of each of the current sources 770–777 via the registers 750–757 and DACs 760–767. For example, controller 240 sends a digital signal representing the appropriate power level via bus 759 to register 750. Register 750 holds this digital value and provides it to DAC 760 which converts it to a corresponding analog signal that represents the appropriate current level. The read current source 770 is thus adjusted to the appropriate power level for reading of data by laser LA.

Figure 10B:
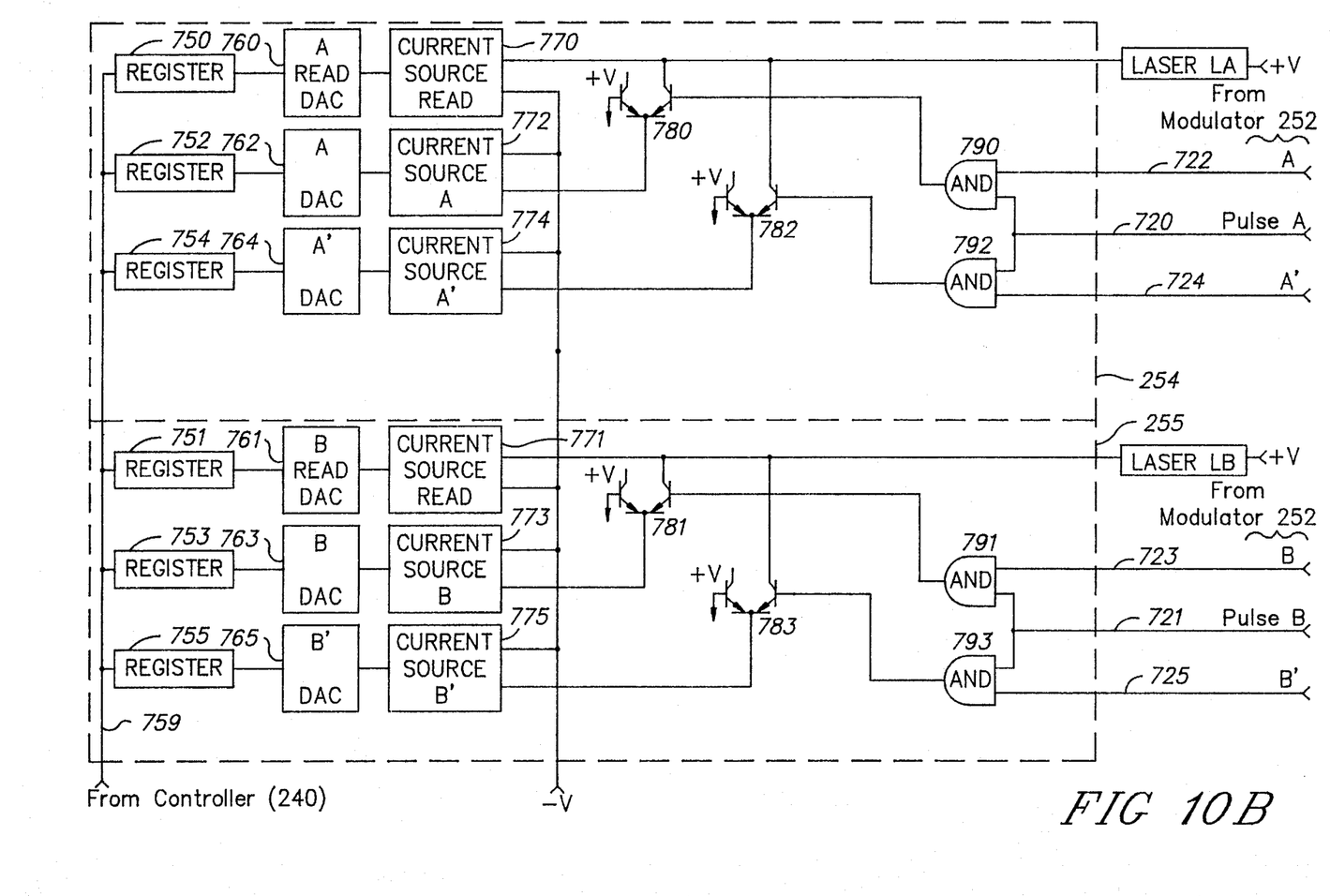
FIG. 10B is a circuit diagram of the modulator for the laser drivers that implements edge-interleaved writing.

FIG. 10B is a circuit diagram illustrating the preferred embodiment of laser drivers 254, 255 that implement edge-interleaved writing according to the present invention. This circuit is identical to that shown in FIG. 10A with the exception that one less register, DAC, current source and transistor pair is needed for each laser because in the edge-interleaved writing embodiment there are only two power levels (A=B and A'=B').

For both embodiments of laser driver 254 as described above, the current sources are adjusted to achieve the desired laser power level at the disk. The read current source 770 provides enough current such that the lasers do not heat the disk to above its Curie temperature during the reading of data. Current sources 772 and 773 are set such that their respective lasers LA and LB will provide a beam of maximum power level A and B, respectively, at the disk. This maximum power level value is set at the time of manufacture or may be determined by a calibration process on start-up of the optical disk drive. In the preferred embodiment, with pulse duration of 15 ns or less, the power level A=B is approximately 20 milliwatts at the disk. Once current sources 772 and 773 are set, the power levels of the remaining current sources are determined. In the preferred embodiment of the laser drivers 254, 255 for both mark-interleaved and edge-interleaved writing, the current sources for laser LA are set equal to their respective current sources for laser LB.

In the preferred operation for mark-interleaved writing (FIG. 10A), the read current source 770 to laser LA is switched off during writing. The laser light from laser LA during writing provides a sufficient reflected light beam 180 (FIG. 1) for tracking and focus servo signals. Alternatively, laser LA may be always on, even during writing, to provide the reflected beam 180. Also, if laser LA is always on, the read current source 770 may be switched to an even lower power level during writing to further reduce thermal buildup in the disk. Such a lower power level is less than that required to read data from the disk, but adequate to generate the servo signals. As shown in FIG. 10A, input lines 722, 724, 726 from modulator 252 are connected to transistors 780, 782, 784, respectively. These transistors allow additional current from the current sources 772, 774, 776 to flow to laser LA when these lines are raised. Thus, laser LA is normally on at the reduced read power level, but will be raised to the higher power levels A, A', A" for 15 nanosecond durations as required to write the desired patterns. Laser LB is operated in a similar manner. The operation of the system for edge-interleaved writing (FIG. 10B) is similar with the exception that there are only two write power levels (A=B, A'=B') for each of the lasers.

Operation With Mark-Interleaved and Edge-Interleaved Writing

Referring again to FIG. 1, the operation of disk drive 100 will now be explained. During the write operation, the digital signal from the host computer is sent the PWM encoder 250 that converts the digital signal to encoded digital data. This data is sent to the modulator 252 that converts the data into instructions to the two laser drivers 254, 200 for writing the desired pulsed pattern of the present invention. In the preferred embodiment, the pattern is the (1,7) RLL pattern shown in FIGS. 5A and 5B. The lasers LA and LB are pulsed by the laser drivers 254, 255 in response to this modulation and provide pulsed beams 152, 153 at the desired power levels. Beams 152, 153 are powerful enough to heat the disk 110 to above the Curie temperature. At this temperature, disk 110 may be magnetically aligned in either an up or down direction by an external magnetic field. Disk 110 is initially magnetically aligned in a first direction. Controller 240 causes bias magnet driver 132 to energize bias magnet 130 in the opposite direction to the magnetic alignment of the disk. The desired data pattern is thus recorded on the disk as changes in magnetic domain orientations.

Referring again to FIG. 3, when beam 152 is exactly focused on disk 110, beam 196 will have a circular cross section 500 on detector 222. The sum of the amount of light hitting areas C and D will be approximately equal to the sum of the amount of light hitting sections A, B, E and F, and will cause circuit 224 to generate a zero focus error signal. If beam 152 is slightly out of focus one way or the other, beam 196 will have a circular cross section 502 or 504 on detector 222. This change in circular cross section causes circuit 224 to generate a positive or negative focus error signal. The focus error signal is used by the focus servo 228 to control motor 176 to move lens 172 until the focus is again achieved.

If beam 152 is focused precisely on a data track of disk 110, then beam 196 will fall as a circular cross section 500 equally between the sections A, C and E, and the sections B, D and F. If beam 152 is off track, beam 196 will fall more on sections A, C and E, and less on sections B, D and F, or visa versa. This will result in a positive or negative tracking error signal being produced by circuit 230. This tracking error signal is then used by the tracking servo 232 to control motor 122 to move head 120 until the beam 152 is again on track.

During a read operation, controller 240 causes laser driver 254 to energize laser array 150 to generate the low power read level beam 152. Beam 152 hits disk 110. The low power beam does not heat disk 110 to above its Curie temperature. The reflected light 180 has its plane of polarization rotated one way or the other depending upon the magnetic domain orientations of the spots on the disk 110. These differences in polarization are detected by detectors 208 and 214, and data circuit 216 outputs a PWM data signal. The PWM decoder 218 converts the signal back to a digital signal which is then sent to the host computer.

In the present invention, the write pulse duration should be as short as possible and is 15 ns or less in the preferred embodiment. The pulse duration should be less than the clock period T for proper operation and much less than the clock period T at the outer track of the disk. The clock period T will depend upon the disk size and rotational speed. Another advantage of the short duration write pulses is that there is a reduction in jitter, which is a measure of the deviation of the mark transitions from their ideal locations.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical disk drive comprising:
   an optical disk having a data layer with tracks for the storage of data, the data layer being responsive to heat;
   two lasers having their laser beams directed to the disk for heating spots on a track of the data layer, the laser beams being spaced apart a distance along the track;
   a motor for rotating the disk relative to the laser beams;
   a laser driver connected to each of the lasers for pulsing the lasers;
   a data encoder responsive to an input data stream for generating data patterns to be represented as marks made on the track of the data layer by the lasers, a mark being comprised of a single spot or a series of connected spots, each spot in the series being contiguous with or overlapping with an adjacent spot in the series; and
   a modulator connected to the data encoder and the laser driver for controlling the pulsing of the lasers in response to the data patterns from the data encoder, whereby after a first spot is made in the track by pulsing a first one of the two lasers a second spot adjacent said first spot is made by pulsing the second one of the two lasers after the first spot has traveled said spacing distance.

2. The disk drive of claim 1 wherein the data encoder is a pulse position modulation encoder, and wherein the marks made on the disk are all substantially the same length, all of the spots in a first mark are made by pulsing a first one of the two lasers, and all of the spots in the mark adjacent the first mark are made by pulsing the second one of the two lasers.

3. The disk drive of claim 1 wherein the data encoder is a pulse width modulation encoder.

4. The disk drive of claim 3 wherein the modulator is a mark-interleaved modulator for pulsing a first one of the two lasers to form all of the spots in a first mark and for pulsing the second one of the two lasers to form all of the spots in the mark adjacent the first mark.

5. The disk drive of claim 3 wherein the modulator is an edge-interleaved modulator for pulsing a first one of the two lasers to form the leading spot of a first mark and for pulsing the second one of the two lasers to form the trailing spot of said first mark.

6. The disk drive of claim 1 wherein the data encoder is a run-length-limited data encoder.

7. The disk drive of claim 1 wherein the two lasers are formed as a two-element laser array.

8. The disk drive of claim 1 further comprising a single objective lens for simultaneously focusing both of the laser beams to spaced-apart spots on the disk.

9. The disk drive of claim 1 wherein the modulator includes means for delaying the pulsing of one of the lasers, the delay time being determined in part by said spacing distance of the two lasers.

10. The disk drive of claim 9 further comprising a clock for timing the reading and writing of data and wherein the delaying means comprises a settable delay element for determining the delay time in response to a fixed integer number of clock cycles and a phase delay representative of a fraction of a clock cycle.

11. The disk drive of claim 1 wherein the disk has a magneto-optic data layer.

12. The disk drive of claim 1 wherein the disk has a phase change data layer.

13. The disk drive of claim 1 wherein the disk has a data layer formed of two materials that form an alloy when exposed to heat from the laser beams.

14. An optical disk drive comprising:
   an optical disk having a data layer with tracks for the storage of data, the data layer being responsive to heat;
   first and second lasers having their laser beams directed to the disk for heating spots on a track of the data layer, the laser beams being spaced apart a fixed distance along the track;
   a motor for rotating the disk relative to the laser beams;
   a laser driver connected to each of the lasers for pulsing the lasers;
   a pulse width modulation data encoder responsive to an input data stream for generating data patterns to be represented as marks made on the track of the data layer by the lasers, a mark being comprised of a single spot or a series of connected spots, each spot in the series being contiguous with or overlapping with an adjacent spot in the series; and
   a modulator connected to the data encoder and the laser driver for controlling the pulsing of the lasers in response to the data patterns from the data encoder, the modulator including a delay element for delaying the pulsing of the second laser by a delay time determined in part by said fixed spacing distance; whereby a delay time after a spot forming the trailing edge of a first mark is made in the track by pulsing the first laser, a spot forming the leading edge of a mark adjacent said first mark is made in the track by pulsing the second laser.

15. The disk drive of claim 14 wherein the modulator is a mark-interleaved modulator for pulsing the first laser to form all of the spots in said first mark and for pulsing the second laser to form all of the spots in the mark adjacent said first mark.

16. The disk drive of claim 14 wherein the modulator is an edge-interleaved modulator for pulsing the first laser to form the leading spot of said first mark and for pulsing the second laser to form the trailing spot of said first mark.

17. The disk drive of claim 14 wherein the pulse width modulation data encoder is a run-length-limited data encoder.

18. The disk drive of claim 14 wherein the two lasers are formed as a two-element laser array.

19. The disk drive of claim 14 further comprising a single objective lens for simultaneously focusing both of the laser beams to spaced-apart spots on the disk.

20. The disk drive of claim 14 further comprising a clock for timing the reading and writing of data and wherein the delay element comprises a settable delay element for determining the delay time in response to a fixed integer number of clock cycles and a phase delay representative of a fraction of a clock cycle.

21. The disk drive of claim 14 wherein the disk has a magneto-optic data layer.

22. The disk drive of claim 14 wherein the disk has a phase change data layer.

23. The disk drive of claim 14 wherein the disk has a data layer formed of two materials that form an alloy when exposed to heat from the laser beams.

* * * * *